United States Patent
Hamazaki et al.

(10) Patent No.: US 7,434,863 B2
(45) Date of Patent: Oct. 14, 2008

(54) ROTATION SEAT FOR VEHICLE

(75) Inventors: Yasuhiro Hamazaki, Kariya (JP); Kazushi Kamiya, Kariya (JP); Tomoaki Terada, Kariya (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 11/781,457

(22) Filed: Jul. 23, 2007

(65) Prior Publication Data

US 2008/0018141 A1    Jan. 24, 2008

(30) Foreign Application Priority Data

Jul. 24, 2006    (JP)    ............... P2006-200286

(51) Int. Cl.
  *B60N 2/14*    (2006.01)
  *B60N 2/38*    (2006.01)

(52) U.S. Cl. .............. 296/65.07; 296/65.06; 296/65.18; 297/344.21

(58) Field of Classification Search .............. 296/65.01, 296/65.05, 65.06, 65.07, 65.09, 65.18; 297/344.21, 297/344.22, 344.23
See application file for complete search history.

(56) References Cited

U.S. PATENT DOCUMENTS

| | | | | |
|---|---|---|---|---|
| 2,290,464 A | * | 7/1942 | Buchheit | 296/65.07 |
| 3,831,699 A | * | 8/1974 | Wolter | 180/330 |
| 4,487,445 A | * | 12/1984 | Jonnston | 296/65.07 |
| 4,733,903 A | * | 3/1988 | Bailey | 296/65.07 |
| 4,802,706 A | * | 2/1989 | Onimaru et al. | 296/68 |
| 5,474,353 A | * | 12/1995 | Koester et al. | 296/65.07 |
| 6,027,170 A | * | 2/2000 | Benz et al. | 297/344.21 |
| 6,086,142 A | * | 7/2000 | Simmons et al. | 296/190.01 |
| 6,572,172 B1 | * | 6/2003 | Ninomiya et al. | 296/65.12 |
| 6,814,174 B2 | * | 11/2004 | Fluent et al. | 180/329 |
| 6,962,383 B2 | * | 11/2005 | Takenoshita et al. | 296/65.03 |
| 7,219,961 B2 | * | 5/2007 | Priepke et al. | 297/344.21 |
| 7,334,829 B2 | * | 2/2008 | Fukui et al. | 296/65.11 |

FOREIGN PATENT DOCUMENTS

| | | |
|---|---|---|
| JP | 62-039337 | 2/1987 |
| JP | 2005-335925 | 12/2005 |

* cited by examiner

*Primary Examiner*—D. Glenn Dayoan
*Assistant Examiner*—Greg Blankenship
(74) *Attorney, Agent, or Firm*—Morgan & Finnegan, LLP

(57) ABSTRACT

A rotation seat for a vehicle has a seat, a rotating plate and a base plate. The seat is fixed on the rotating plate which has a nail member and a biasing member. The biasing member forces the nail member. The rotating plate is rotatably connected to the base plate through a first shaft. The base plate has a guide slot so as to regulate extent of the rotation of the rotating plate by guiding the nail member. The guide slot has a first slot and a second slot. The biasing unit forces the second slot through the nail member so as to make the rotating plate rotate from an operator's exiting position to a forward driving position.

12 Claims, 11 Drawing Sheets

Forward

Forward

Forward Driving Position

Forward

Reverse Driving Position

Forward

Operator's Exiting Position

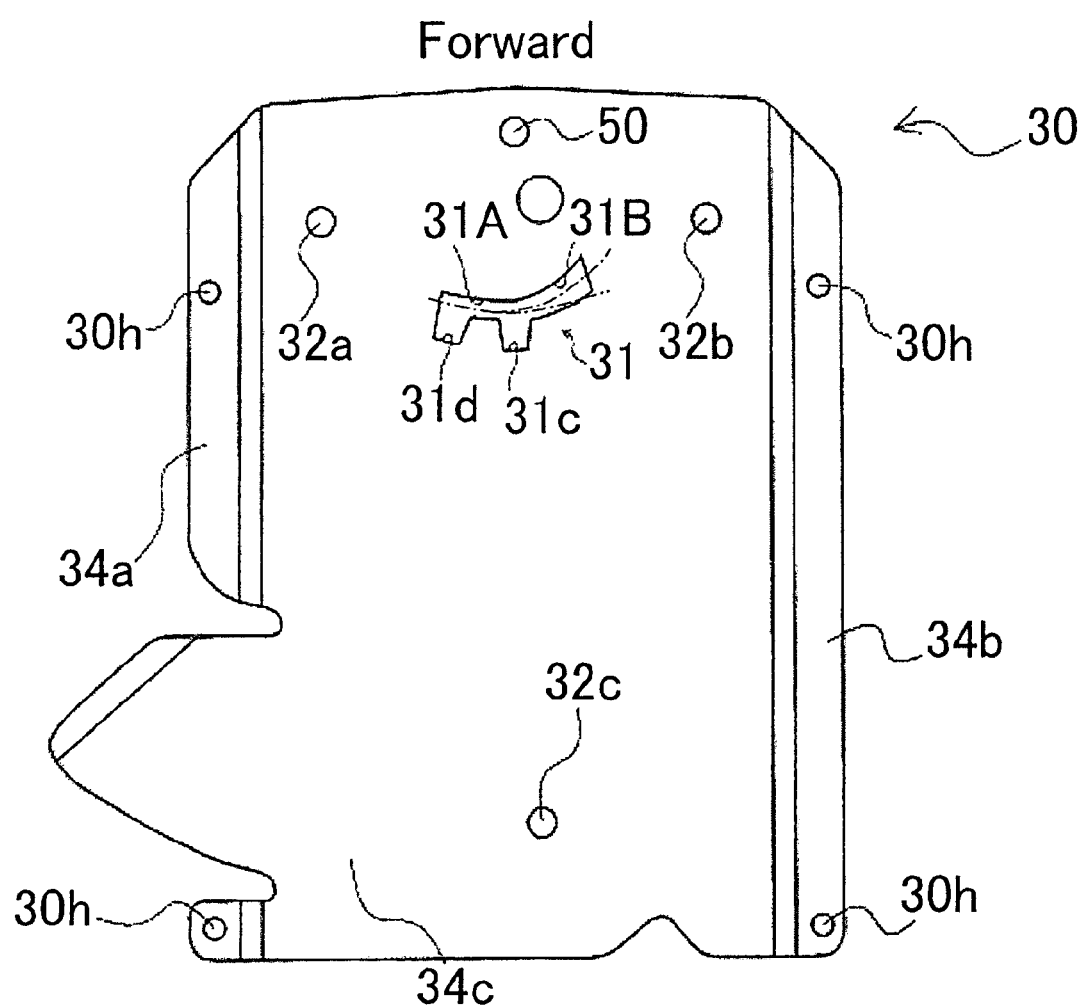

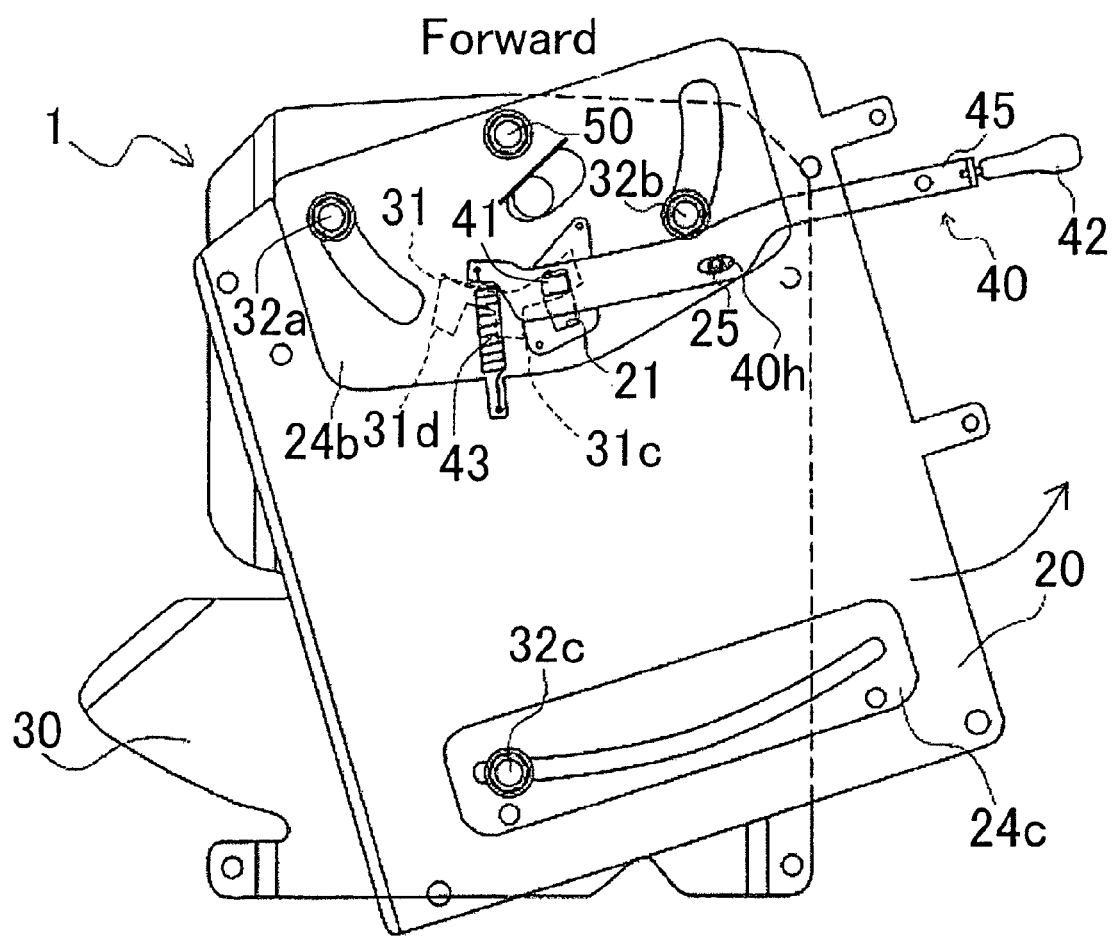

ROTATION SEAT FOR VEHICLE

BACKGROUND OF THE INVENTION

The present invention relates to a rotation seat for a vehicle. More particularly, the invention relates to a rotation seat which can rotate to a proper position to facilitate an operator exiting the vehicle.

Japanese Unexamined Patent Application Publication No. 2005-335925 discloses that an industrial vehicle has a seat 14 which can rotate to between a forward driving position, a right facing position and a left facing position (See FIG. 11). The seat 14 has an engagement plate 26 fixed on a lower portion of the seat 14. The engagement plate 26 is formed in the shape of an arc.

The engagement plate 26 has a separate recess (27a, 27b, 27c) corresponding to each of the forward driving position, the right facing position and the left facing position, respectively. An electromagnetic solenoid 28 is fixed on a body of the vehicle, and the electromagnetic solenoid 28 has a moveable iron core 29. After the seat 14 is rotated to one of the above-mentioned positions, the moveable iron core 29 is engaged in the recess corresponding to the position so as to fix the seat 14 at the position.

In the above-mentioned constitution, while seated, the operator rotates the seat 14 to the left facing position to facilitate the operator exiting the vehicle. After the operator has exited the vehicle, the seat 14 can only be returned to the forward driving position by the operator manually pushing the seat.

In certain cases based on the relative size of the seat and the operator, it may be physically difficult for the operation to return the seat from the left facing position to the forward driving position, which imposes a relatively large physical burden on the operator.

SUMMARY OF THE INVENTION

The present invention is directed to a rotation seat for a vehicle. The rotation seat has a rotating mechanism which facilitates the return of the seat from the operator's exiting position to a forward driving position, by the exertion of only a relatively small force.

This improved rotation seat has a following feature. A rotation seat for a vehicle has a base plate fixed on a body of the vehicle, a rotating plate rotatably connected to the base plate through a first shaft, and a seat fixed on the rotating plate. The base plate includes a guide slot which has a first slot formed in the shape of an arc centered about the first shaft and a second slot having first end connecting to the first slot and second end. The second slot is formed in the shape of curve so as to make the second end approach the first shaft. The rotating plate includes a nail member which is rotatable with the rotating plate and a biasing unit for forcing the nail member. The nail member is displaceable in relation to the first shaft and is guided by the guide slot so as to limit rotation of the rotating plate. The seat is rotatable with the rotating plate to a forward driving position and an operator's exiting position. The second slot guides the nail member when the seat is rotated between the forward driving position and operator's exiting position, and the biasing member forces the second slot through the nail member so as to make the rotating plate rotate from the operator's exiting position to the forward driving position.

It is not intended that the invention be summarized here in its entirety. Rather, other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 3 is an upper view illustrating a base plate illustrated in FIG. 1;

FIG. 7 is an upper view illustrating a state that the rotating plate, illustrated in FIG. 5, is fixed in the operator's exiting position;

DETAILED DESCRIPTION OF THE PREFERRED EMBODIMENTS

A rotation seat for a vehicle according to a preferred embodiment of the present invention will now be described with reference to FIGS. 1 through 9. In this embodiment, the rotation seat is adapted to an industrial vehicle such as a forklift truck.

Figure 1:
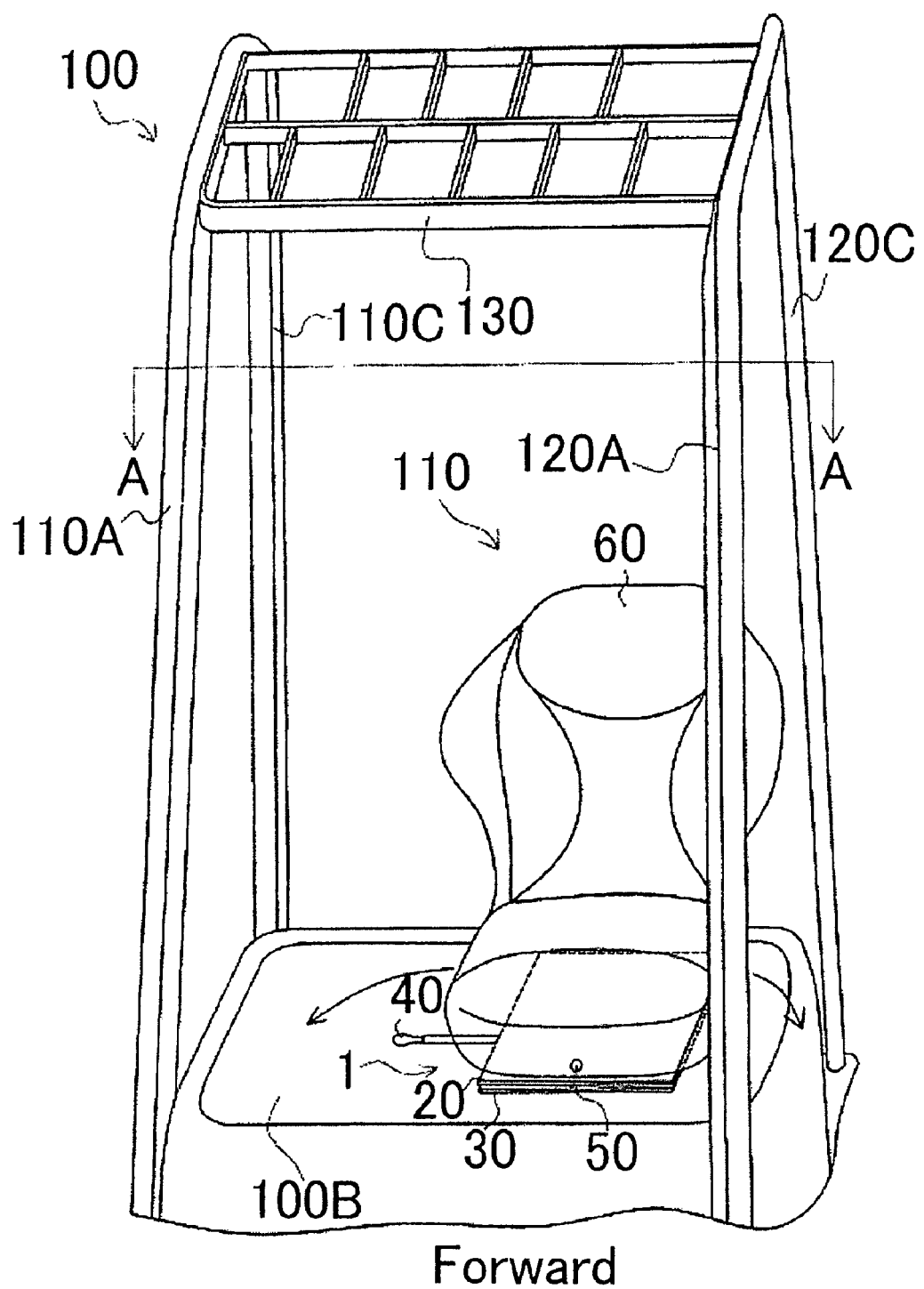
FIG. 1 is a partial perspective view illustrating a seat according to a preferred embodiment of the present invention.

As shown in FIG. 1, a seat area 100 includes a rotation seat 110, pillars 110A and 110C and 120A and 120C, and a head guard 130. The rotation seat 110 includes a base 100B fixed on a body of the industrial vehicle, a rotating mechanism 1 placed on the base 100B, and a seat 60 placed on the rotating mechanism 1. The rotating mechanism 1 includes a rotating plate 20 fixed on the lower part of the seat 60, a lever 40 placed on the rotating plate 20, a base plate 30 fixed on the base 100B, and a first shaft 50 that rotatably supports the rotating plate 20 above the base plate 30.

An operator sits on the seat 60. The seat 60 is placed so as to rotate about the first shaft 50 in relation to the base 100B. The seat 60 is rotatable between a forward driving position (illustrated in FIG. 2A), a reverse driving position (illustrated in FIG. 2B) wherein the operator observes the reverse motion of the vehicle by glancing over his, right shoulder, and an operator's exiting position (illustrated in FIG. 2C). Instrumentation and control equipment (not shown) for operation of the industrial vehicle are placed forward of the seat 60. In the below explanation, both a forward-and-reverse direction and a left-and-right direction are shown based on the perspective of the operator who faces forward when sitting on the seat 60.

Figure 2A:
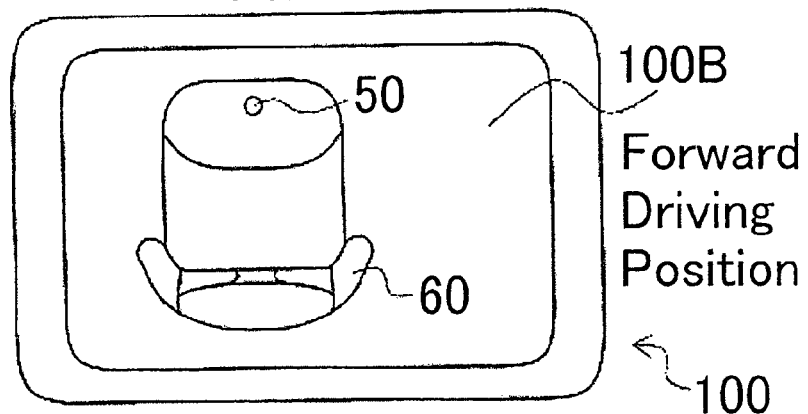
FIG. 2A is an explanation drawing illustrating the seat fixed at a forward driving position, taken along the line A-A in FIG. 1.
Figure 2B:
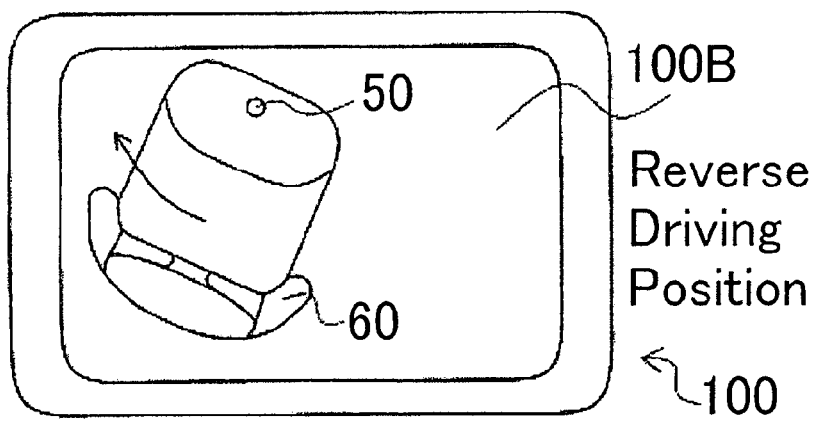
FIG. 2B is an explanation drawing illustrating the seat fixed at a reverse driving position, taken along the line A-A in FIG. 1.
Figure 2C:
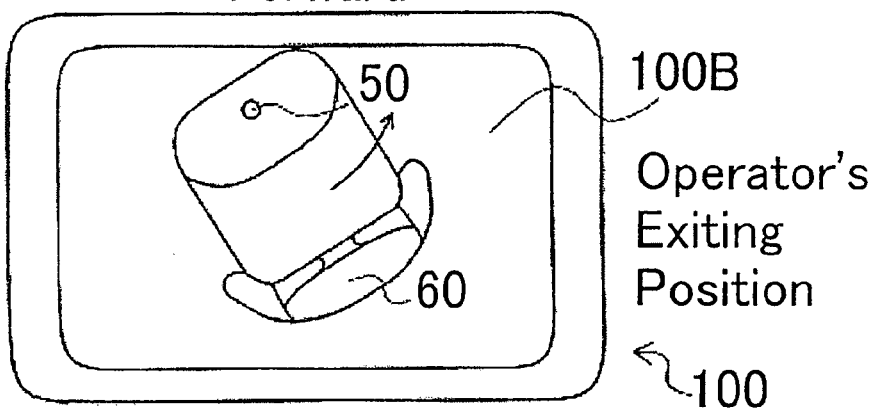
FIG. 2C is an explanation drawing illustrating the seat fixed at an operator's exiting position, taken along the line A-A in FIG. 1.

As shown in FIG. 2A the seat 60 is engaged in the forward driving position when the industrial vehicle is driven in the forward direction. When the industrial vehicle is driven in the reverse direction, the seat 60 is rotated to and engaged in the reverse driving position, as depicted in FIG. 2B. When engaged in the reverse driving position, the seat 60 faces to the right relative to the front so that the operator may conveniently access the operator controls and accelerator pedal while looking over his right shoulder to observe the reverse movement of the vehicle. As shown in FIG. 2C, when the operator gets off, the seat 60 is rotated to the operator's exiting position and faces to the left relative to the front. By the rotating mechanism 1, the seat 60 is allowed to switch between, in relation to the base 100B, an unlocked stated in which the seat 60 is rotatable and a locked state in which the seat 60 is not rotatable. The release of the locked state is performed by operation of the lever 40.

The details of the rotating mechanism 1 will be described, with reference to FIGS. 3 to 9.

(Base Plate)

The base plate 30 is formed by stamping out and bending a metal plate. As shown in FIG. 3, an abutment 34a is formed nearby a left side of the base plate 30, and an abutment 34b is formed nearby a right side of the base plate 30. Two holes 30h are formed on each of the abutments 34a and 34b. The base plate 30 is fixed on the base 100B by inserting and screwing bolts or other thread items into the holes 30h. A flat portion 34c is formed between the abutments 34a and 34b. The flat portion 34c is raised substantially higher than the abutments 34a and 34b. On a forward side of the flat portion 34c, the first shaft 50 extends straight upward from the upper face of the flat portion 34c so as to rotatably support the rotating plate 20 vertically spaced apart from the upper face of the base plate 30 (See FIGS. 5 to 7).

Each of shafts 32a and 32b and 32c extends straight upward from the upper face of the flat portion 34c. The shaft 32a is placed proximate to the abutment 34a and the shaft 32b is placed proximate to the abutment 34b on the front side of the flat portion 34c. The shaft 32c is placed on a rear side of the base plate 30.

A guide slot 31 is formed in the flat portion 34c so as to regulate the extent of the rotation of the rotating plate 20. A nail member 41 placed on the lever 40 is installed into the guide slot 31. The guide slot 31 includes a first slot 31A formed in the shape of an arc centered about the first shaft 50, and a second slot 31B. First end of the second slot 31B connects to the first slot 31A. The second slot 31B is formed in the shape of curve so as to make second end of the second slot 31B approach the first shaft 50. When the rotating plate 20 rotates between the forward driving position and the reverse driving position, the first slot 31A guides the nail member 41. When the rotating plate 20 rotates between the forward driving position and the operator's exiting position, the second slot 31B guides the nail member 41. The guide slot 31 has a first recess 31c and a second recess 31d. Each of the first recess 31c and the second recess 31d extends rearward, away from the first shaft 50. Preferably, the guide slot 31 limits the rotation of the rotating plate 20 between about 25-degrees right and about 17-degrees left relative to the front. As described later, the rotating plate 20 is fixed at the forward driving position by engaging the nail member 41 in the first recess 31c and is fixed at the reverse driving position by engaging the nail member 41 in the second recess 31d.

The width of each of the first recess 31c and the second recess 31d is tapered so as to narrow at its bottom, away from the guide slot 31. In other words, each of the first recess 31c and the second recess 31d is in the shape of a wedge. Therefore, the nail member 41 can easily enter the first recess 31c or the second recess 31d. The first recess 31c is formed in about the middle of the guide slot 31. The first recess 31c corresponds to the forward driving position. When the nail member 41 is engaged in the first recess 31c, the rotating plate 20 is fixed at the forward driving position. At this time, the rotating plate 20 makes an angle of 0 degree relative to the front. The second recess 31d is corresponds to the reverse driving position. When the nail member 41 is engaged in the second recess 31d, the rotating plate 20 is fixed at the reverse driving position. Preferably, at this time, the rotating plate 20 makes an angle of about 17 degrees to the left relative to the front.

(Rotating Plate)

Figure 4:
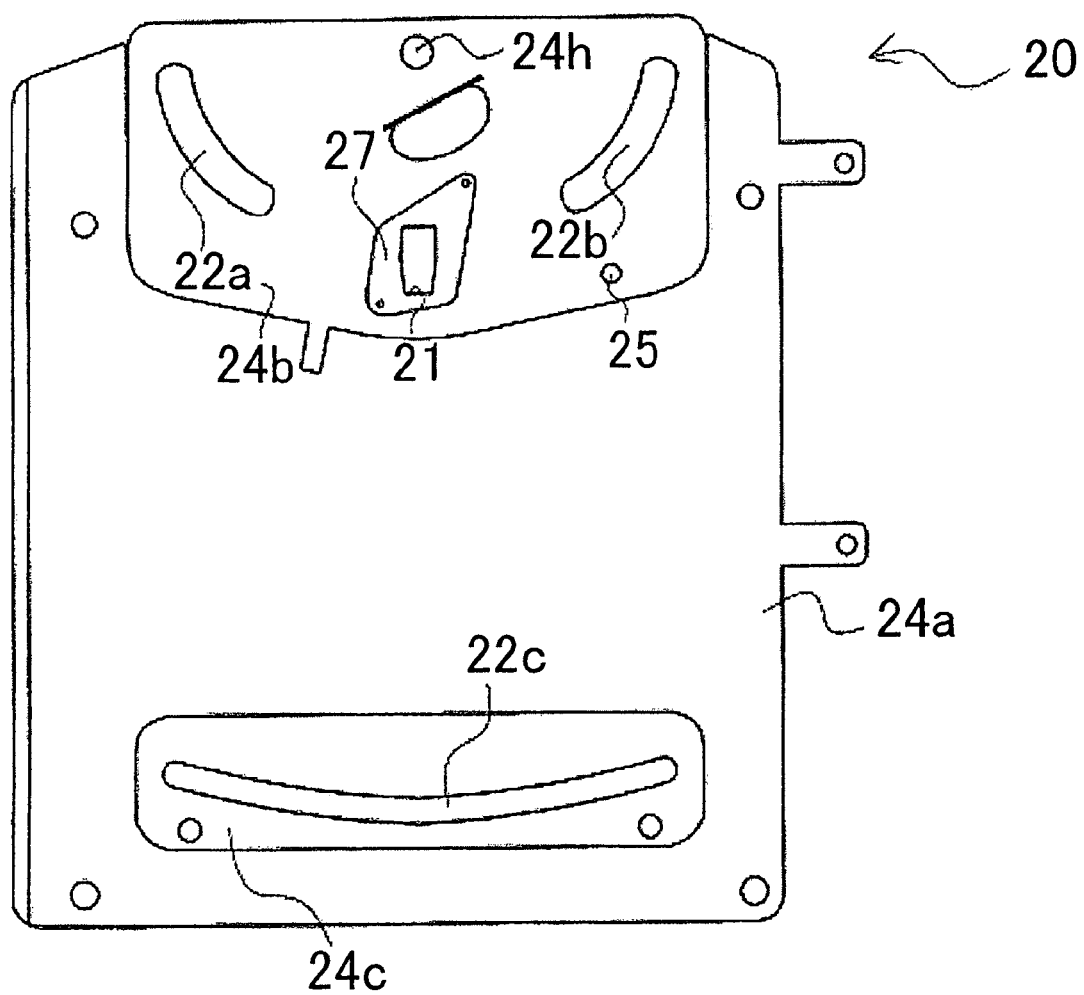
FIG. 4 is an upper view illustrating a rotating plate illustrated in FIG. 1.

The details of the rotating plate 20 will be described with reference to FIGS. 4 and 5. The rotating plate 20 is formed in the shape of a plate. The rotating plate 20 is affixed to the bottom surface of the seat 60. The rotating plate 20 is rotatably connected to the base plate 30 through the first shaft 50. As shown in FIG. 4, the rotating plate 20 includes a pedestal 24a and lower portions 24b and 24c. Both of the lower portions 24b and 24c extend downward from the pedestal 24a toward the upper face of the flat portion 34a of the base plate 30.

The lower portion 24b is formed in a forward side of the rotating plate 20. The lower portion 24c is formed in the rear side of the rotating plate 20. A hole 24h and recesses 22a and 22b are formed in the lower portion 24b. The first shaft 50 extending straight upward from the base plate 30 is inserted in the hole 24h. The shaft 32a extending straight upward from the base plate 30 is inserted in the recess 22a. The shaft 32b extending straight upward from the base plate 30 is inserted in the recess 22b. A recess 22c is formed in the lower portion 24c. The shaft 32c extending straight upward from the base plate 30 is inserted in the recess 22c.

Each of the recesses 22a and 22b and 22c is formed in the shape of an arc centered about the first shaft 50. The length of each of the recesses 22a and 22b and 22c is prescribed so as to correspond to the length of the guide slot 31 in the base plate 30. The guide slot 31 regulates the extent of the rotation of the rotating plate 20. When the rotating plate 20 is connected to the base plate 30, each of the shaft 32a and 32b and 32c and 50 is held on the rotating plate 20 by a nut. The support slot 21 is formed on the lower portion 24b (illustrated in FIG. 5). When the lever 40 is rotatably fixed to the rotating plate 20, the nail member 41 extending from the lever 40 is inserted into the support slot 21 formed in the lower portion 24b. The second shaft 25 rotatably supports the lever 40 in relation to the rotating plate 20. The second shaft 25 is placed away from the support slot 21 (See FIG. 5).

The support slot 21 regulates the scope of the movement of the lever 40. The nail member 41 is moveable in the forward-and-rearward direction along the support slot 21. Therefore, the nail member 41 is moveable from the guide slot 31 into the first recess 31c or into the second recess 31d and vice versa. The movement of the nail member 41 in relation to the rotating plate 20 is regulated in the direction from the guide slot 31 into the first recess 31c or into the second recess 31d and vice versa.

As shown in FIG. 8, the width of the support slot 21 tapers so as to narrow in the direction from the guide slot 31 to first recess 31c or the second recess 31d (in other words, in the rearward direction) and in the direction from first recess 31c or the second recess 31d to the guide slot 31 (in other words, in the forward direction).

A support plate 27 includes a hole corresponding to the support slot 21. The support plate 27 is secured around the support slot 21 on the lower portion 24b, so that the nail member 41 is prevented from disfiguring the support slot 21.

(Lever)

The second shaft 25 is inserted into an elliptical hole 40h formed in the middle of the lever body 45 of the lever 40. The lever 40 is rotatably fixed to the rotating plate 20 by the second shaft 25. A grip 42 for manipulating the lever 40 is secured on one end of the lever body 45 which extends to the right of the rotating plate 20. A nail member 41 is extended from the other end of the lever body 45 which is placed over the support slot 21. As shown in FIG. 5, the nail member 41 penetrates the support slot 21 of the rotating plate 20 and is inserted into the guide slot 31 of the base plate 30.

The second shaft 25 is disposed on the rotating plate 20 at a location outside of an arc (illustrated by one-dot chain line X in FIG. 5) whose portion is drawn by the first slot 31A. The lever 40 is formed so that a line connecting the second shaft 25 with the nail member 41 (illustrated by one-dot chain line Y in FIG. 5) is the substantially same as a tangent line of the first slot 31A when the rotating plate 20 is in the forward driving position. Therefore, the nail member 41 is allowed to move vertically in relation to the direction that the rotating plate 20 rotates about the first shaft 50. Thus, the nail member 41 can move relative to the rotating plate 20.

Preferably, the nail member 41 is formed in the shape of a hexagon. The width of the nail member 41 narrows so as to correspond to the first recess 31c and the second recess 31d. As shown in FIG. 8, the width of the nail member 41 narrows as going toward the first recess 31c or the second recess 31d (in other words, going rearward). Also, the width of the nail member 41 narrows as going toward the guide slot 31 (in other words, going forward).

By manipulating the lever 40 via the grip 42, the nail member 41 is engaged in the first recess 31c or the second recess 31d and is moved along the guide slot 31. Therefore, it is possible to switch between locking and unlocking the rotating plate 20 on the base plate 30 so that the rotating plate 20 can be rotated from side to side.

A coil spring 43, which acts as a biasing unit and a resilient member for urging the lever 40, is placed on the other end of the lever body 45, opposite from the grip 42. The coil spring 43 urges the nail member 41 through the lever 40 in the reward direction, away from the first shaft 50. In other words, the coil spring 43 urges the lever 40 so that the nail member 41 is urged to engage with the first recess 31c or the second recess 31d. An action point which receives the urging force of the coil spring 43 is showed with Z illustrated in FIG. 5. The coil spring 43 is placed so that the urged direction of the lever 40 is in the substantially vertical direction in relation to a straight line connecting Z with the second shaft 25. Therefore, all the urging force of the coil spring 43 acts so as to make the lever 40 rotate and is used more effectively. The urged direction of the lever 40 may be inclined with respect to the vertical direction as long as the urged force by the coil spring 43 has a force component in the direction so as to make the lever 40 rotate.

The longitudinal direction of the elliptical hole 40h almost corresponds to the direction along the guide slot 31. Therefore, the lever 40 is allowed to move in opposition to urging force of the coil spring 43. Further, when the nail member 41 is moved from the first recess 31c or the second recess 31d to the guide slot 31, the lever 40 is movable in corresponding to a space between the second shaft 25 and elliptical hole 40h. Also, when the nail member 41 is moved between the guide slot 31 and the first recess 31c or the second recess 31d by manipulating the lever 40, the elliptical hole 40h provides for a smooth transition between engaging and disengaging the nail member 41 with the first recess 31c or the second recess 31d.

(Rotation Seat)

The movement of the rotation seat 110 will be described, with reference to FIGS. 2A and 8A. Where the seat 60 is in the forward driving position (illustrated in FIG. 2A), the nail member 41 is engaged in the first recess 31c (illustrated in FIG. 8A), thus the rotating plate 20 is prevented from rotating, and is locked on the base plate 30. Further, by the urging force of the coil spring 43, the nail member 41 is urged so as to engage in the first recess 31c. Therefore, while the lever 40 is not manipulated, the nail member 41 is kept in the first recess 31c. In this state, the lever 40 is movable in relation to the space between the second shaft 25 and the elliptical hole 40h. Note that, the nail member 41 can easily engage in the first recess 31c since each of the nail member 41 and the first recess 31c is in the shape of a wedge.

(Rotation from the Forward Driving Position to the Reverse Driving Position)

The rotation, from the forward driving position to the reverse driving position, of the seat 60 will be described with reference to FIGS. 6 and 8A to 8D.

Figure 8A:
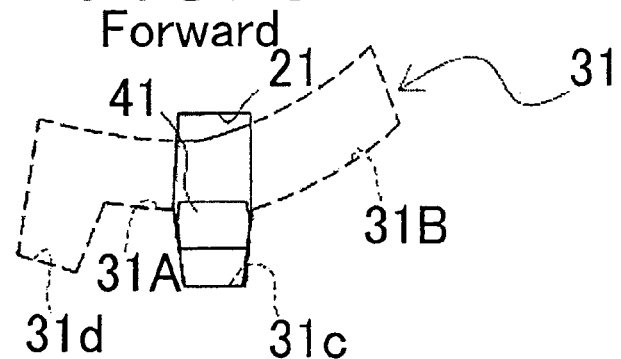
FIG. 8A is a drawing illustrating movement of a nail member from the forward driving position to the reverse driving position according to a preferred embodiment of the present invention.
Figure 8B:
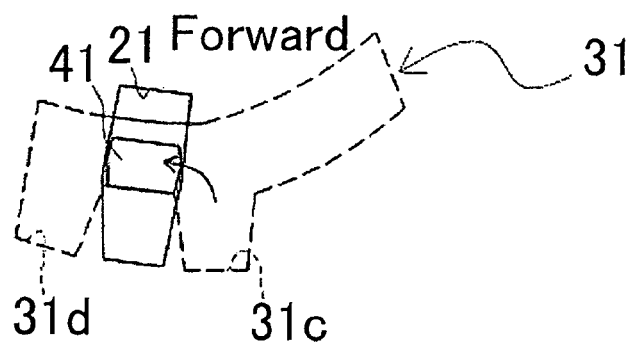
FIG. 8B is a drawing illustrating movement of a nail member from the forward driving position to the reverse driving position according to a preferred embodiment of the present invention.
Figure 8C:
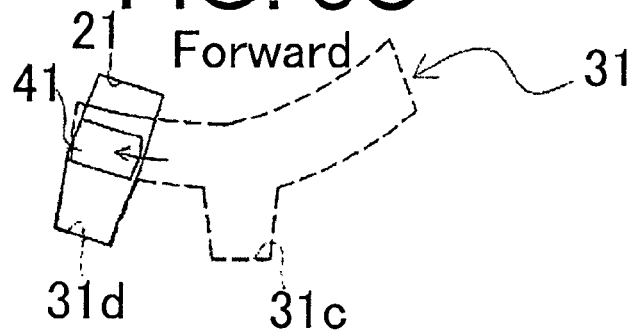
FIG. 8C is a drawing illustrating movement of a nail member from the forward driving position to the reverse driving position according to a preferred embodiment of the present invention.
Figure 8D:
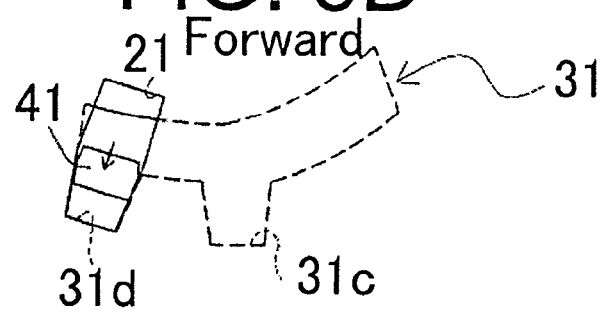
FIG. 8D is a drawing illustrating movement of a nail member from the forward driving position to the reverse driving position according to a preferred embodiment of the present invention.

First, the lever 40 is operated so as to disengage the nail member 41 from the first recess 31c (illustrated in FIG. 8A). In this embodiment, the operator moves the grip 42 forward in opposition to the urging force of the coil spring 43. When the nail member 41 is disengaged from the first recess 31c, the nail member 41 draws a trajectory of an arc centering the second shaft 25 since the lever 40 pivots on the second shaft 25.

Then, when the nail member 41 is placed in the guide slot 31 (in other words, when the rotating plate 20 is unlocked on the base plate 30), the operator twists his body while sitting on the seat 60 and keeping his feet on the body of the industrial vehicle, the seat is directly loaded and is rotated to the reverse driving position. Also, the lever 40 is pulled so as to rotate to the left so that the seat 60 is loaded so as to rotate through the lever 40. Therefore, the rotating plate 20, which is fixed on the seat 60 rotates to the left. When the rotating plate 20 is rotated to the left (illustrated in FIG. 8B), the nail member 41 moves toward the second recess 31d (illustrated in FIG. 8). At this time, where the operator releases the lever 40, by the urging force of the coil spring 43, the lever 40 moves in the direction so as to engage the nail member 41 in the second recess 31d (illustrated in FIG. 8D). If necessary, by properly moving the lever 40 in relation to the second shaft 25, the nail member 41 is easily engaged in the second recess 31d.

Figure 6:
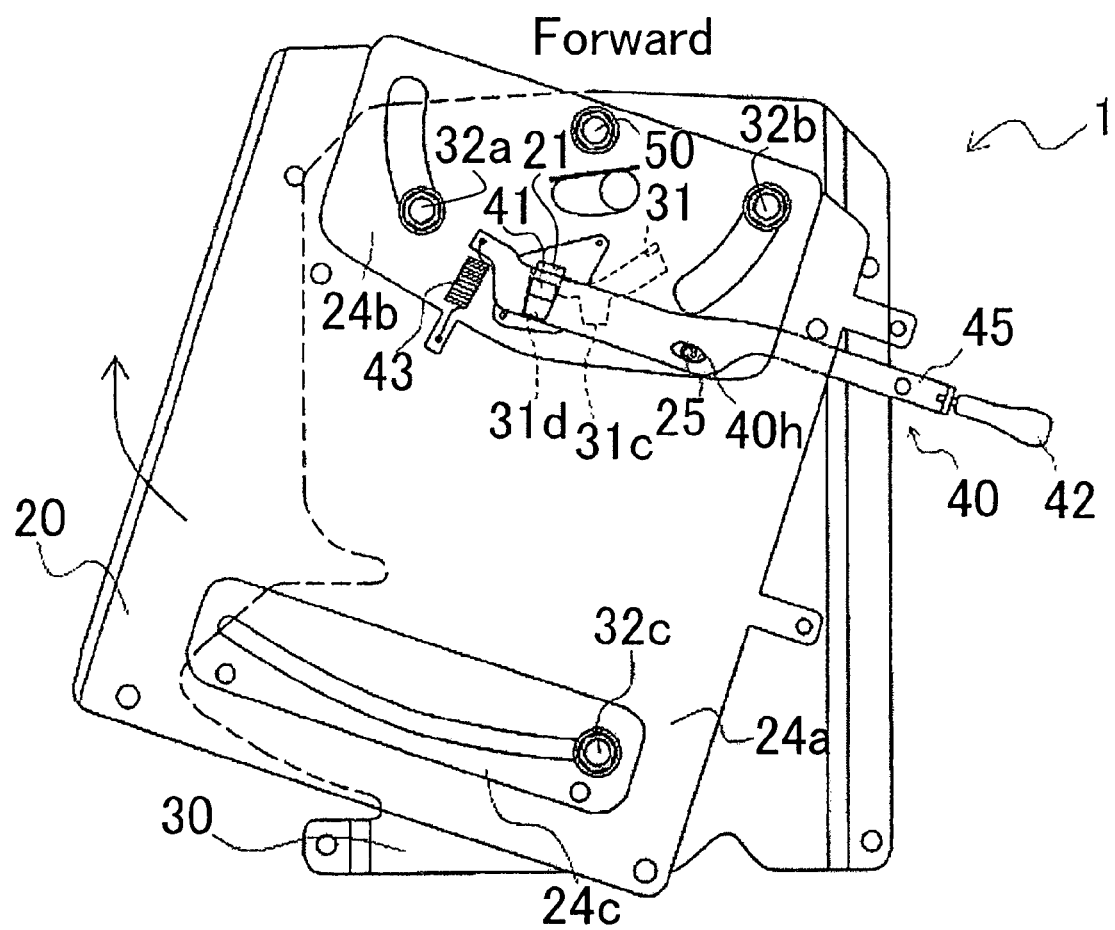
FIG. 6 is an upper view illustrating a state that the rotating plate, illustrated in FIG. 5, is fixed in the reverse driving position.

As illustrated in FIG. 6, when the nail member 41 is engaged in the second recess 31d, the rotating plate 20 is rotated to face the right. Therefore, preferably, the seat 60 is disposed at an angle of about 25 degrees right with respect to the front. The operator sitting on the seat 60 faces obliquely to the right rather than in the forward direction. The seat 60 is kept in this state so long as the lever 40 is not manipulated.

In this case, where the vehicle is operated in the reverse direction, it is easy and convenient for the operator to look over his right shoulder to observe the reverse movement of the vehicle since the body of the operator is faced obliquely right rather than in the forward direction.

(Rotation from the Forward Driving Position to the Operator's Exiting Position)

The rotation, from the forward driving position to the operator's exiting position, of the seat 60 will be described with reference to FIGS. 2C, 7, and 9A to 9C.

Figure 9A:
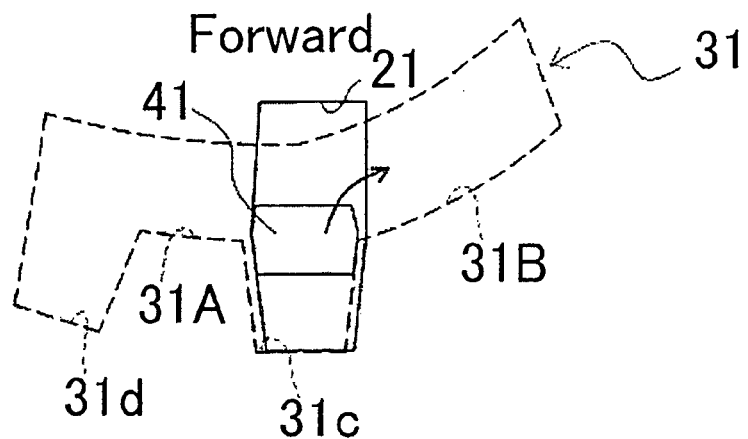
FIG. 9A is a drawing illustrating movement of the nail member from the forward driving position to the operator's exiting position according to a preferred embodiment of the present invention.
Figure 9B:
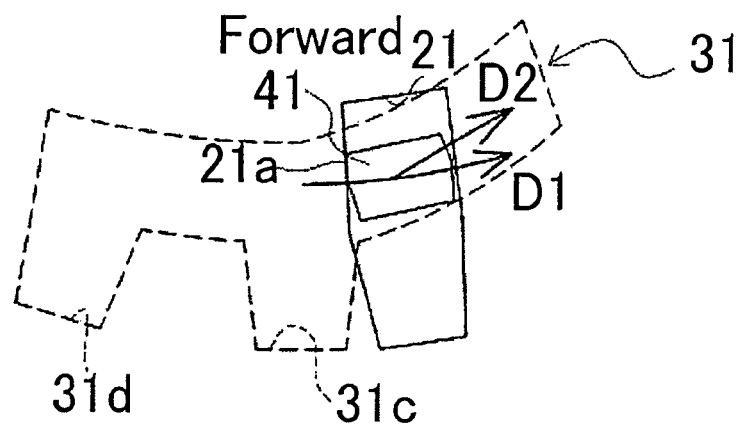
FIG. 9B is a drawing illustrating movement of the nail member from the forward driving position to the operator's exiting position according to a preferred embodiment of the present invention.

First, in the same way that the seat 60 is rotated to the reverse driving position, the nail member 41 is disengaged from the first recess 31c (illustrated in FIG. 9A). Then, when the nail member 41 is placed in the second slot 31B, the operator loads the seat 60 directly by twisting his body and/or through the lever 40 so as to Make the seat 60 rotate to the operator's exiting position. Therefore, the rotating plate 20 rotates to face the left (at this time, the support slot 21 moves to the right illustrated in FIG. 9). As the rotating plate 20 rotates to the left, the nail member 41 is urged by the left side 21a of the support slot 21, thus the nail member 41 is made to rotate about the first shaft 50 in the direction of arrow D1 illustrated in FIG. 9B. At this time, the second slot 31B is upslope in relation to D1. Therefore, the nail member 41 is loaded by the second slot 31B so as to approach toward the first shaft 50 and is moved in the direction (illustrated by arrow D2 in FIG. 9B) along the slope of the second slot 31B. Thus, when the rotating plate 20 rotates in the direction D1, the coil spring 43 is extended and the nail member 41 is moved with the support slot 21 in the direction so as to approach the first shaft 50 (illustrated in FIG. 7).

Figure 9C:
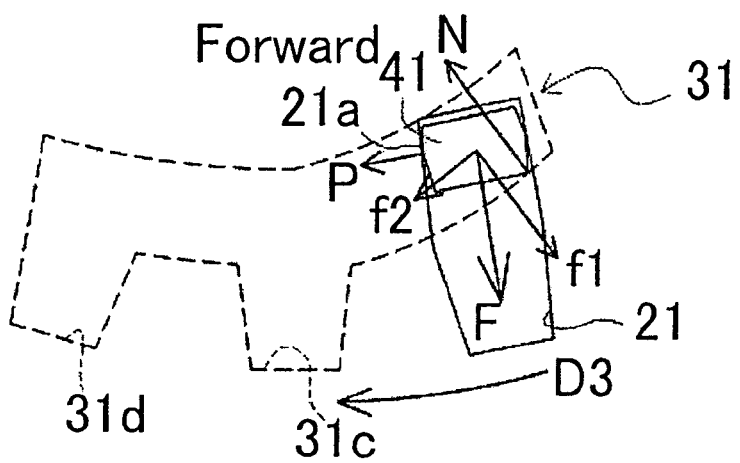
FIG. 9C is a drawing illustrating movement of the nail member from the forward driving position to the operator's exiting position according to a preferred embodiment of the present invention.

Also, when the seat 60 is on the operator's exiting position, the nail member 41 is urged by the coil spring 43 in the direction along the support slot 21, in other words in the direction (illustrated by arrow F in FIG. 9C) going away from the first shaft 50. The urged force F is declined toward the forward driving position in relation to the vertical direction with the slope of the second slot 31B. As shown in FIG. 9C, the urged force F can be divided into force component f1 and force component f2. The f1 component is in a vertical direction with the slope of the second slot 31B. The f2 component is toward the forward driving position in the direction along the second slot 31B. From the slope of the second slot 31B, the nail member 41 receives vertical repulsion force N in relation to the f1 component. Therefore, when the nail member 41 abuts the left side 21a of the support slot 21 and provides the rotation force P (illustrated in FIG. 9C), the rotating plate 20 is made to rotate so as to return toward the forward driving position (corresponding to D3 illustrated in FIG. 9C). In other words, the rotating plate 20 is rotated from the operator's exiting position to the forward driving position with repulsion force provided by urging the slope of the second slot 31B with the nail member 41.

Therefore, it becomes possible to return the seat 60 from the operator's exiting position to the forward driving position by applying only a relatively small force. If the friction between the nail member 41 and the second slot 31B or between the nail member 41 and the support slot 21 is made relatively small, it is possible to automatically return the seat 60 from operator's exiting position to the forward driving position by only the urging force of the coil spring 43, without the application of any additional force by the operator.

In the operator's exiting position, where the seat 60 is rotated to the right, it is convenient for the operator to exit since the body of the operator faces to the left side for exiting the industrial vehicle (illustrating in FIGS. 2C and 7).

As described above, the coil spring 43 is placed on the rotating plate 20. The guide slot 31 is formed in the base plate 30. The nail member 41 is movable relative to the rotating plate 20. Therefore, when the seat 60 is at the operator's exiting position, the rotating plate 20 receives the force of repulsion so as to move relative to the base plate 30 since the coil spring 43 exerts a force against the wall forming the second slot 31B through the nail member 41.

In this structure, the second slot 31B guides the nail member 41 when the seat 60 is between the forward driving position and the operator's exiting position. The second slot 31B is formed so as to exist inside of the arc centering the first shaft 50. The portion of the arc is formed by the first slot 31A. The slope of the second slot 31B is formed so as to make the rotating plate 20 rotate about the first shaft 50. Therefore, when the slope of the second slot 31B is urged through the nail member 41 by the coil spring 43 placed on the rotating plate 20, repulsion force is given so as to make the rotating plate 20 rotate about the first shaft 50 relatively to the base plate 30. Thus, when the seat 60 is at the operator's exiting position, it becomes possible to return the seat 60 to the forward driving position by the application of only a relatively small force.

Also, when the seat 60 is rotated to the forward driving position, the nail member 41 is engaged in the first recess 31c since the nail member 41 is urged in the direction going away from the first shaft 50 by the coil spring. Also, when the seat 60 is rotated to the reverse driving position, the nail member 41 is engaged in the second recess 31d since the nail member 41 is urged in the direction going away from the first shaft 50 by the coil spring. Therefore, it is possible to lock the seat 60 at the forward diving position or the reverse driving position by the above-mentioned simple structure without adding any new parts.

Also, the nail member 41 is engaged in or disengaged from the first recess 31c (or the second recess 31d) in response to the movement of the lever 40. Therefore, by manipulating the lever 40, it is possible to switch between locking and unlocking the rotating plate 20 on the base plate 30, thus the seat 60 is made to rotate easily.

Also, the nail member 41 is kept to engage in the first recess 31c (or the second recess 31d) since the nail member 41 is urged in the direction toward the first recess 31c (or the second recess 31d) by the coil spring 43. Therefore, it is not necessary to manipulate the lever 40 so as to engage the nail member 41 in the first recess 31c (or the second recess 31d). Only when the nail member 41 is made to disengage from the first recess 31c or the second recess 31d, it is necessary to manipulate the lever 40, thus the lever 40 is operated efficiently.

Also, the second shaft 25 is placed outside of the arc whose portion is drawn by the first slot 31A, so that the direction of the urging force F (illustrated in FIG. 9) with which the nail member 41 urges the second slot 31B is declined toward the forward driving position in relation to the slope of the second slot 31B. Therefore, force component f2 is allowed to increase in magnitude, thus it is possible to make the rotation force P greater and load the rotation force P on the rotating plate 20. Thus, when the seat 60 is placed at the operator's exiting position, the operator can return the seat 60 to the forward driving position with the application of only a relatively small force.

Also, the second shaft 25 is placed on the tangential line of the arc whose portion is formed by the first slot 31A, so that the nail member 41 is moved vertically with the arc by the movement of the lever 40. Therefore, it is possible to stably engage the nail member 41 in the first recess 31c (or the second recess 31d) since the engaging direction of the nail member 41 in relation to the first recess 31c (or the second recess 31d) coincides with the movement direction of the nail member 41.

In the present invention, the following alternative implementations are also encompassed.

Figure 10:
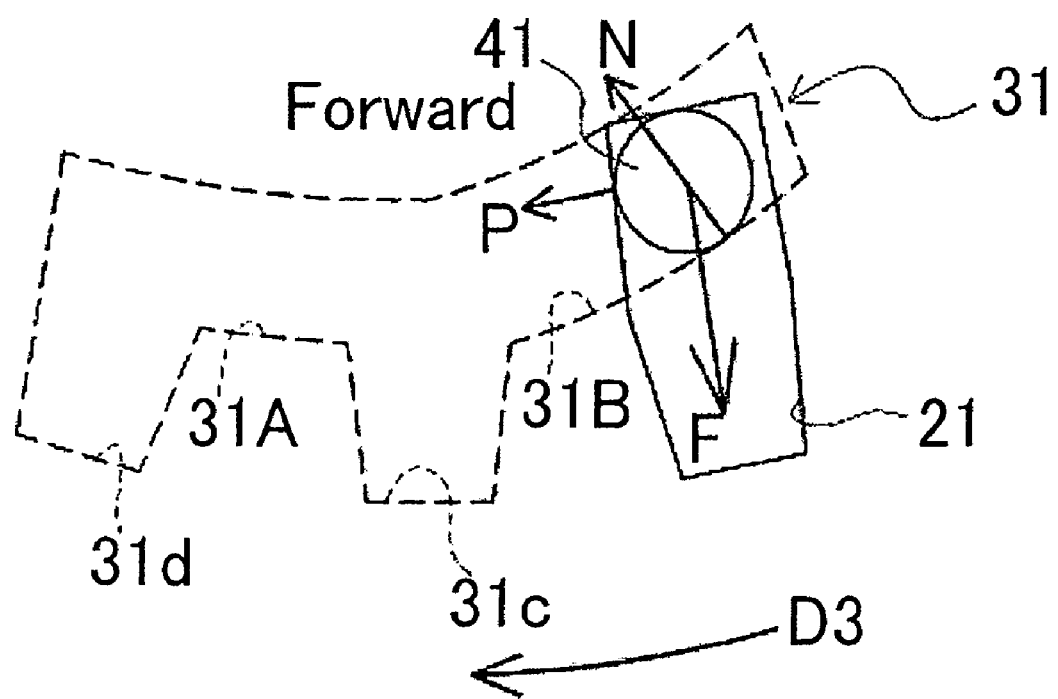
FIG. 10 is a partial view illustrating an alternative implementation of the nail member.

In alternative embodiments to the preferred embodiments, as shown in FIG. 10, the nail member 41 is in the shape of circular. In this case, the friction between the nail member 41 and the guide slot 31 is relatively small, and the nail member 41 contacts the guide slot 31 only slightly. Therefore, the nail member 41 is prevented from deforming, and it is possible to make the nail member 41 move more stably. Also, when the nail member 41 is guided by the second slot 31B, an angle of the lever 40 in relation to the slope of the second slot 31B changes. In other words, the nail member 41 is guided while rotating relative to the slope of the second slot 31B. If the nail member 41 is flat-shaped, the length of the nail member 41 changes in the direction of the width of the second slot 31B while rotating, so that it is necessary to adjust the width.

In alternative embodiments to the preferred embodiments, however, the length of the nail member 41 is not changed since the nail member 41 is in the shape of a circular. Therefore, it is not necessary to adjust the width. Where the width of the first slot 31A is the same as the width of the second slot 31B, the first slot 31A and the second slot 31B can be formed effectively and easily.

In the above-described preferred embodiments, the resilient member such as the coil spring 43 is adopted as the biasing unit. In alternative embodiments to the preferred embodiments, however, the biasing unit is not limited to the resilient member. The urging force of an electromagnetic solenoid or the force of a magnet is used as the biasing unit.

In the above-described preferred embodiments, the rotating plate 20 is locked or unlocked on the base plate 30 by the lever 40. In alternative embodiments to the preferred embodiments, however, a wire is used instead of the lever 40. In this case, by pulling the wire from outside, the nail member 41 is engaged in our disengaged from the first recess 31c (or the second recess 31d).

In the above-described preferred embodiments, the number of the recesses (the first recess 31c and the second recess 31d) formed on the guide slot 31 is two. In alternative embodiments to the preferred embodiments, however, the number of the recesses is three or more.

In the above-described preferred embodiments, the seat is adopted to the industrial vehicle. In alternative embodiments to the preferred embodiments, however, the seat is adopted to a passenger car etc. Also, in an industrial vehicle like a forklift truck, the seat in the present invention is used more effectively since an operator often gets on-and-off or drives in the reverse direction.

Therefore, the present examples and embodiments are to be considered as illustrative and not restrictive and the invention is not to be limited to the details given herein but may be modified within the scope of the appended claims.

This application claims a foreign priority benefit based on Japanese Patent Application No. 2006-200286, filed on Jul. 24, 2006, which is hereby incorporated by reference herein in its entirety as if fully set forth herein.

What is claimed is:

1. A rotation seat for a vehicle, the rotation seat comprising:
a base plate fixed on a body of the vehicle, the base plate including a guide slot;
the guide slot including:
a first slot formed in the shape of an arc centered about a first shaft; and
a second slot having first end connecting to the first slot and second end, the second slot being formed in the shape of curve so as to make the second end approach the first shaft;
a rotating plate rotatably connected to the base plate through the first shaft,
the rotating plate including:
a nail member being rotatable with the rotating plate, the nail member being displaceable in relation to the first shaft, the nail member being guided by the guide slot so as to regulate rotation of the rotating plate; and
a biasing unit for urging the nail member;
a seat fixed on the rotating plate, the seat being rotatable with the rotating plate to a forward driving position and an operator's exiting position, wherein the second slot guides the nail member when the seat is rotated between the forward driving position and operator's exiting position, the biasing member exerts a force on a wall forming the second slot through the nail member so as to make the rotating plate rotate from the operator's exiting position to the forward driving position.

2. The rotation seat of claim 1, wherein the biasing unit is a resilient member.

3. The rotation seat of claim 1, wherein the guide slot further comprises a first recess extended in the direction away from the first shaft, wherein the nail member is urged in the direction away from the first shaft by the biasing unit, and the rotating plate is locked at the forward driving position where the nail member is engaged in the first recess.

4. The rotation seat of claim 1, wherein the rotating plate further comprises a support slot, the nail member being inserted into the support slot.

5. The rotation seat of claim 1, wherein the nail member is formed in the shape of a hexagon.

6. The rotation seat of claim 1, wherein the guide slot further comprises a second recess extended in the direction away from the first shaft, wherein the seat is rotatable with the rotating plate to a reverse driving position, and the nail member is urged in the direction away from the first shaft by the biasing unit, and the rotating plate is locked at the reverse driving position where the nail member is engaged in the second recess.

7. The rotation seat of claim 1, further comprises a lever for switching to between locking and unlocking the rotating plate on the base plate, wherein the rotating plate further comprises a second shaft for rotatably supporting the lever, wherein the nail member is placed on the lever, and the biasing unit urges the nail member through the lever.

8. The rotation seat of claim 3, wherein width of the first recess is tapered so as to narrow at the bottom thereof away from the guide slot.

9. The rotation seat of claim 3, further comprises a lever for switching to between locking and unlocking the rotating plate on the base plate, wherein the rotating plate further comprises a second shaft for rotatably supporting the lever, wherein the nail member is placed on the lever, and the biasing unit urges the nail member through the lever, wherein the nail member is engaged in the first recess in response to rotation of the lever.

10. The rotation seat of claim 7, wherein the second shaft is disposed on the rotating plate at a location outside of an arc, portion of the arc being drawn by the first slot.

11. The rotation seat of claim 7, wherein the lever further comprises an elliptical hole for inserting the second shaft.

12. The rotation seat of claim 7, wherein a line drawn by connecting the nail member with the second shaft is tangent to the arc when the nail member is guided in the first slot.

* * * * *

UNITED STATES PATENT AND TRADEMARK OFFICE
CERTIFICATE OF CORRECTION

PATENT NO. : 7,434,863 B2
APPLICATION NO. : 11/781457
DATED : October 14, 2008
INVENTOR(S) : Yasuhiro Hamazaki et al.

Figure 11:
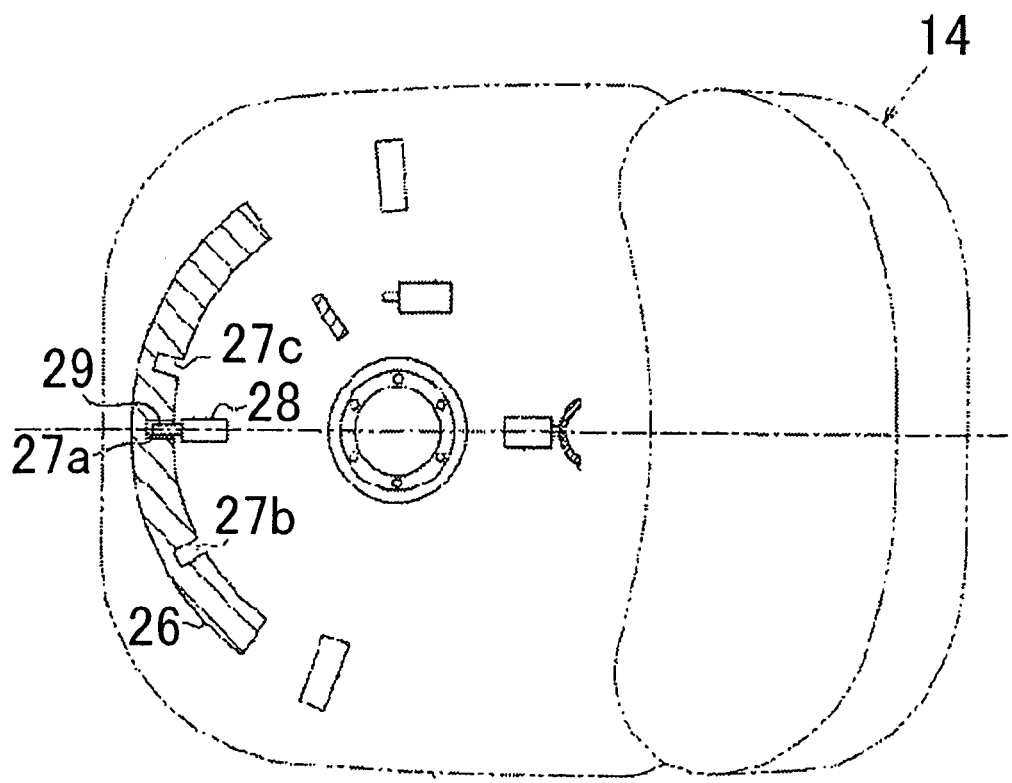
FIG. 11 is a plain view showing a background art rotation seat.

It is certified that error appears in the above-identified patent and that said Letters Patent is hereby corrected as shown below:

Column 1, line 44, please delete "This improved rotation seat has a following feature." and insert therefore --This improved rotation seat has the following features.--;

Column 1, lines 50-51, please delete "a second slot having first end connecting to the first slot and second end." and insert therefore --a second slot having a first end connecting to the first slot and a second end.--;

Column 1, line 51, please delete "The second slot is formed in the shape of curve" and insert therefore --The second slot is formed in the shape of a curve--;

Column 1, lines 60-61, please delete "rotated between the forward driving position and operator's exiting position," and insert therefore --rotated between the forward driving position and the operator's exiting position,--;

Column 2, line 65, please delete "FIG. 11 is a plain view" and insert therefore --FIG. 11 is a plan view--;

Column 3, line 24, please delete "of the vehicle by glancing over his, right shoulder, and" and insert therefore --of the vehicle by glancing over his right shoulder, and--;

Column 4, line 10, please delete "First end of the second slot 31B" and insert therefore --A first end of the second slot 31B--;

Column 4, line 12, please delete "in the shape of curve so as to make second end" and insert therefore --in the shape of a curve so as to make a second end--;

Column 4, lines 39-40, please delete "second recess 31d is corresponds to the reverse driving position." and insert therefore --second recess 31d corresponds to the reverse driving position.--;

Column 5, lines 7-8, please delete "each of the shaft 32a and 32b and 32c and 50" and insert therefore --each of the shafts 32a and 32b and 32c and 50--;

UNITED STATES PATENT AND TRADEMARK OFFICE
CERTIFICATE OF CORRECTION

PATENT NO.         : 7,434,863 B2
APPLICATION NO.    : 11/781457
DATED              : October 14, 2008
INVENTOR(S)        : Yasuhiro Hamazaki et al.

Figure 5:
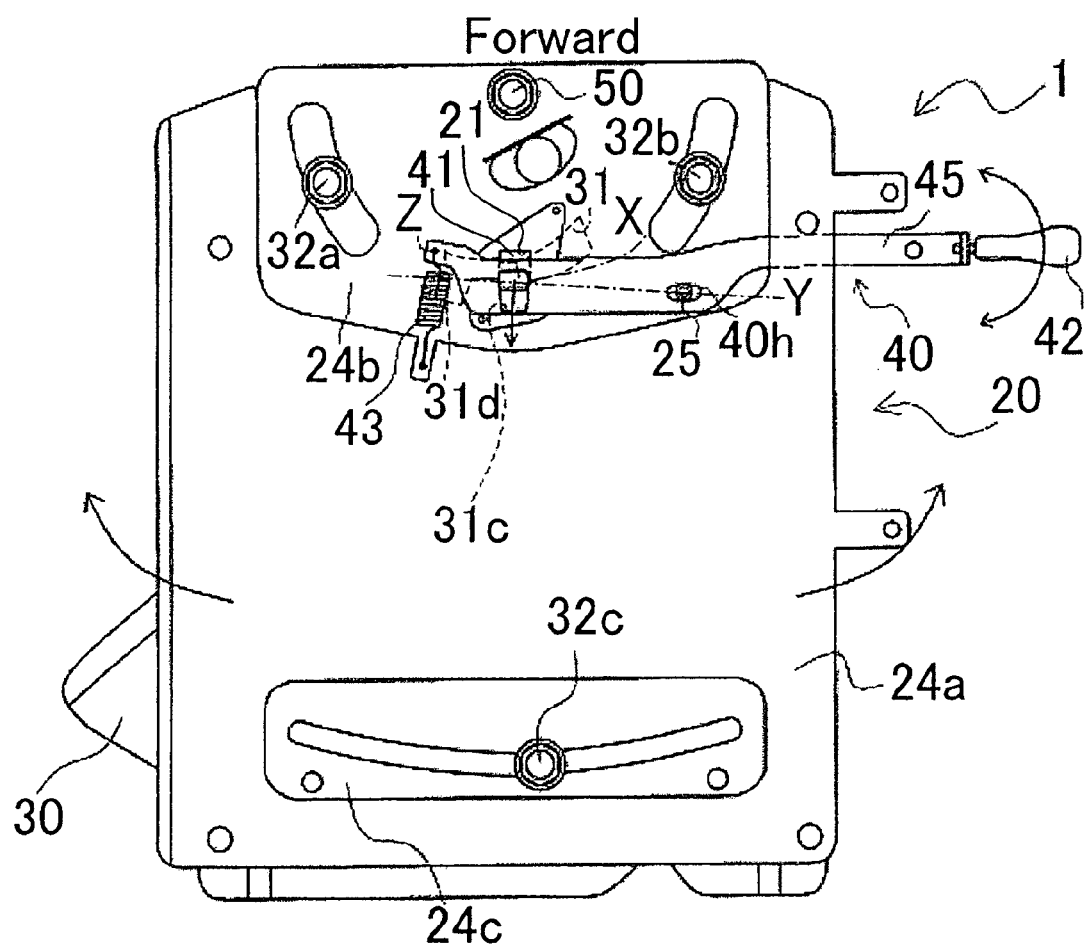
FIG. 5 is an upper view illustrating a rotation mechanism of the seat illustrated in FIG. 1.

It is certified that error appears in the above-identified patent and that said Letters Patent is hereby corrected as shown below:

Column 5, line 51, please delete "FIG. 5) is the substantially same as a tangent line" and insert therefore --FIG. 5) is substantially the same as a tangent line--;

Column 6, lines 8-9, please delete "through the lever 40 in the reward direction," and insert therefore --through the lever 40 in the rearward direction,--;

Column 6, lines 28-29, please delete "the lever 40 is movable in corresponding to a space" and insert therefore --the lever 40 is movable in correspondence to a space--;

Column 7, line 8, please delete "toward the second recess 31d (illustrated in FIG. 8)." and insert therefore --toward the second recess 31d (illustrated in FIG. 8C).--;

Column 7, line 38, please delete "through the lever 40 so as to Make the seat 60 rotate" and insert therefore --through the lever 40 so as to make the seat 60 rotate--;

Column 7, line 54, please delete "Also, when the seat 60 is on the operator's exiting position" and insert therefore --Also, when the seat 60 is in the operator's exiting position--;

Column 8, lines 14-15, please delete "the seat 60 from operator's exiting position" and insert therefore --the seat 60 from the operator's exiting position--;

Column 8, line 21, please delete "(illustrating in FIGS. 2C and 7)." and insert therefore --(illustrated in FIGS. 2C and 7).--;

Column 9, lines 1-2, please delete "it is necessary to manipulate the lever 40," and insert therefore --is it necessary to manipulate the lever 40,--;

Column 9, lines 28-29 and 43, please delete "the nail member 41 is in the shape of circular." and insert therefore --the nail member 41 is in the shape of a circle.--; and Column 9, line 59, please delete "engaged in our disengaged from the first recess 31c" and insert therefore --engaged in or disengaged from the first recess 31c--.

UNITED STATES PATENT AND TRADEMARK OFFICE
CERTIFICATE OF CORRECTION

PATENT NO. : 7,434,863 B2
APPLICATION NO. : 11/781457
DATED : October 14, 2008
INVENTOR(S) : Yasuhiro Hamazaki et al.

It is certified that error appears in the above-identified patent and that said Letters Patent is hereby corrected as shown below:

In the Claims

In Claim 1, column 10, lines 22-24, please delete "a second slot having first end connecting to the first slot and second end, the second slot formed in the shape of curve" and insert therefore --a second slot having a first end connecting to the first slot and a second end, the second slot formed in the shape of a curve--;

In Claim 1, column 10, lines 39-40, please delete "the forward driving position and operator's exiting position," and insert therefore --the forward driving position and the operator's exiting position,--;

In Claim 8, column 11, lines 5-6, please delete "The rotation seat of claim 3, wherein width of the first recess" and insert therefore --The rotation seat of claim 3, wherein a width of the first recess--; and In Claim 10, column 12, lines 4-5, please delete "disposed on the rotating plate at a location outside of an arc, portion of the arc" and insert therefore --disposed on the rotating plate at a location outside of an arc, a portion of the arc--.

Signed and Sealed this

Twenty-fifth Day of August, 2009

David J. Kappos
*Director of the United States Patent and Trademark Office*